United States Patent
Hünlich et al.

(10) Patent No.: US 6,553,024 B1
(45) Date of Patent: Apr. 22, 2003

(54) METHOD AND CONFIGURATION FOR PROVIDING PERFORMANCE FEATURES FOR MOBILE SUBSCRIBERS VIA A COMMUNICATIONS NETWORK

(75) Inventors: Klaus Hünlich, Neuching (DE); Klaus Wehrend, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/259,915

(22) Filed: Mar. 1, 1999

(30) Foreign Application Priority Data

Feb. 27, 1998 (DE) .......................................... 198 08 369

(51) Int. Cl.⁷ .............................................. H04L 12/66
(52) U.S. Cl. ...................... 370/352; 370/401; 370/410; 370/420; 370/467; 379/88.02; 379/88.07; 379/88.08; 379/93.05
(58) Field of Search ................................ 370/401, 525, 370/404, 410, 419, 420, 463, 352; 379/88.02, 88.07, 88.08, 93.05

(56) References Cited

U.S. PATENT DOCUMENTS 5,416,835 A * 5/1995 Lee ........................ 379/221.08
5,771,465 A * 6/1998 Bojeryd ...................... 455/554
5,859,894 A * 1/1999 Ortiz Perez et al. ........ 379/1.01
5,983,117 A * 11/1999 Sandler et al. .............. 455/557
6,259,691 B1 * 7/2001 Naudus ....................... 370/352
6,353,745 B1 * 3/2002 Wehrend et al. ............ 455/466

OTHER PUBLICATIONS

"Das virtuelle Büro", telcomreport, Issue 4, 1997, Siemens AG Berlin and Munich, Germany, pp. 1–5.

* cited by examiner

Primary Examiner—Alpus H. Hsu
Assistant Examiner—Roberta Stevens
(74) Attorney, Agent, or Firm—Laurence A. Greenberg; Werner H. Stemer; Ralph E. Locher

(57) ABSTRACT

When an external terminal is signed on to a communications system, a voice link is set up between the external terminal and a teleworking subscriber line module of the communications system. Control information which is transferred in the form of DTMF signals from the external terminal via the voice link is converted at the teleworking subscriber line module into signaling information such as is usually available within the scope of a signaling protocol between internal terminals and the communications system.

14 Claims, 2 Drawing Sheets

METHOD AND CONFIGURATION FOR PROVIDING PERFORMANCE FEATURES FOR MOBILE SUBSCRIBERS VIA A COMMUNICATIONS NETWORK

BACKGROUND OF THE INVENTION

Field of the Invention

The invention lies in the telecommunications field. Specifically, the invention pertains to a method and a configuration which provides performance features for mobile subscribers via a communications network.

Because working conditions are becoming increasingly flexible in terms of time and location, the number of employees who do not carry out their professional tasks at their assigned workplace office is rising continuously. The publication "Das virtuelle Büro" [The Virtual Office], telcomreport, Issue 4, 1997, Siemens AG Berlin and Munich describes that for tasks to be carried out effectively outside the company location it is necessary to have access to the communications performance features provided in the company's local communications network, irrespective of the location of the employee. These performance features include the performance features, such as, for example, the setting-up of a conference circuit or signaling of the inputting of a message, which are additional to the standard performance features provided in a, say, ISDN-oriented communications network.

In order to enable the performance features implemented by a communications system to be made available at an external terminal in the same way as at an internal terminal, it has been proposed for terminal-oriented signaling information, such as is usually transferred within the scope of a signaling protocol between the communications system and internal terminals which are connected to it, to be made available between the communications system and the external terminal via a data link which is set up in addition to the user data link.

This requires two user data links to be made available at the external terminal in order to transfer the user data via a first user data link (for example a first ISDN-B channel) and the terminal-oriented signaling information via a second user data link (for example a second ISDN-B channel). Furthermore, it is necessary for the first terminal to be designed in such a way that the terminal-oriented signaling information which has been transferred can be evaluated.

SUMMARY OF THE INVENTION

It is accordingly an object of the invention to provide a method and device for making available performance features in a communications system to an external terminal, which overcomes the above-mentioned disadvantages of the heretofore-known devices and methods of this general type, while making minimum requirements of the external terminal.

With the foregoing and other objects in view there is provided, in accordance with the invention, a method of providing performance features made available to internal subscriber terminating lines in a communications system to an external terminal, the method which comprises:

communicating between internal terminals and a communications system within a defined signaling protocol;

providing a teleworking subscriber line module in the communications system;

setting up a voice link between an external terminal and the teleworking subscriber line module of the communications system by signing on the external terminal with the communications system;

transferring via the voice link control information input at the external terminal in the form of assigned DTMF signals to the teleworking subscriber line module; and identifying the DTMF signals received at the teleworking subscriber line module, converting the DTMF signals into terminal-oriented signaling information according to the defined signaling protocol, and transferring the converted DTMF signals to a control unit of the communications system.

In other words, performance features implemented by a communications system can be made available at an external terminal. For that purpose, control information in the form of DTMF signals (DTMF=Dual Tone Multi-Frequency) is transferred via a voice link from the external terminal to the teleworking subscriber line module in the communications system. For the DTMF signals, each key of a terminal is assigned a characteristic signal which is transferred via the voice link when the key is activated. The signal differs in terms of frequency and signal duration from the data which are usually transferred via the voice link, so that the signals can be identified and evaluated at the teleworking subscriber line module.

A significant advantage of the invention is that the external terminal can be connected to the communications system via any communications network, for example an analog communications network, an ISDN-oriented communications network or a radio network. All that is required of the external terminal is merely that the MFD (Multi-Frequency Dialing method) for generating DTMF signals is supported by the external terminal.

A further advantage of the invention is that the system components which are necessary for the so-called teleworking concept which can be implemented by the invention can easily be integrated into an existing communications system.

In accordance with an added feature of the invention, a teleworking computer for controlling the teleworking subscriber line module is connected to the teleworking subscriber line module via a local computer network. The control information received at the teleworking subscriber line module is thereby transferred to the control unit via the teleworking computer.

In accordance with an additional feature of the invention, a sign-on authorization is checked with the teleworking computer by referring to subscriber-specific data transmitted from the external terminal.

In accordance with another feature of the invention, in the course of a sign-on operation, the teleworking computer assigns a virtual subscriber connection port of the teleworking subscriber line module to the external terminal, and data directed by the control unit to an internal subscriber terminating line as identified by the subscriber-specific data is rerouted to the virtual subscriber connection port.

In accordance with a further feature of the invention, data transferred to the external terminal are output via the virtual subscriber connection port at the external terminal. The output may be in the form of an audible announcement or a visual display.

In accordance with again a further feature of the invention, a connection is set up between the external terminal and a further terminal, subsequently to a sign-on, by routing the terminal link between the external terminal and a further terminal via the teleworking subscriber line module.

In accordance with a preferred embodiment, the control information is transferred from the external terminal to the communications system via the terminal link in a DTMF signal format.

In accordance with again another feature of the invention, if a DTMF signal cannot be identified at the teleworking subscriber line module, the DTMF signal is transferred to the further terminal.

In accordance with again an added feature of the invention, a plurality of terminal links are simultaneously routed in each case between one external terminal signed on to the communications system and one further terminal via the teleworking subscriber line module.

In accordance with again an additional feature of the invention, the internal subscriber terminating line is set up only in the form of a virtual connection port.

With the above and other objects in view there is also provided, in accordance with the invention, a teleworking subscriber line module in a communications system, the communications system having a control unit and a switching matrix unit with a bi-directional, time-division-multiplex-oriented port. The module comprises:

- a signaling unit having an HDLC interface for connecting to a control unit of a communications system;
- a PCM connection unit having a PCM interface for connecting to a bi-directional, time-division-multiplex-oriented port of a switching matrix unit of the communications system, the PCM connection unit having a DTMF connection unit for detecting and evaluating control information received in DTMF signals via a user data link; and
- a conversion unit connected between the signaling unit and the PCM connection unit for converting data to a given transmission protocol and transferring the data between the signaling unit and the PCM connection unit.

In accordance with yet an added feature of the invention, a LAN connection unit with a LAN interface connects the subscriber line module to a local computer network.

In accordance with a concomitant feature of the invention, there is provided an output unit for transferring messages stored in the teleworking subscriber line module to an external terminal. The output unit transfers the messages in a format to be output by the external terminal as an announcement or a visual display.

One advantage of refinements of the invention is that a subscriber who has signed on to the communications system at an external terminal can be accessed on the same call number as the internal terminal assigned to that person.

By assigning virtual connection ports—often referred to as pseudo-connection ports in the literature—subscribers can utilize the performance features of the communications system at an external terminal even if they do not have a physically existing internal terminal assigned to them.

Other features which are considered as characteristic for the invention are set forth in the appended claims.

Although the invention is illustrated and described herein as embodied in a method and configuration for providing performance features for mobile subscribers via a communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
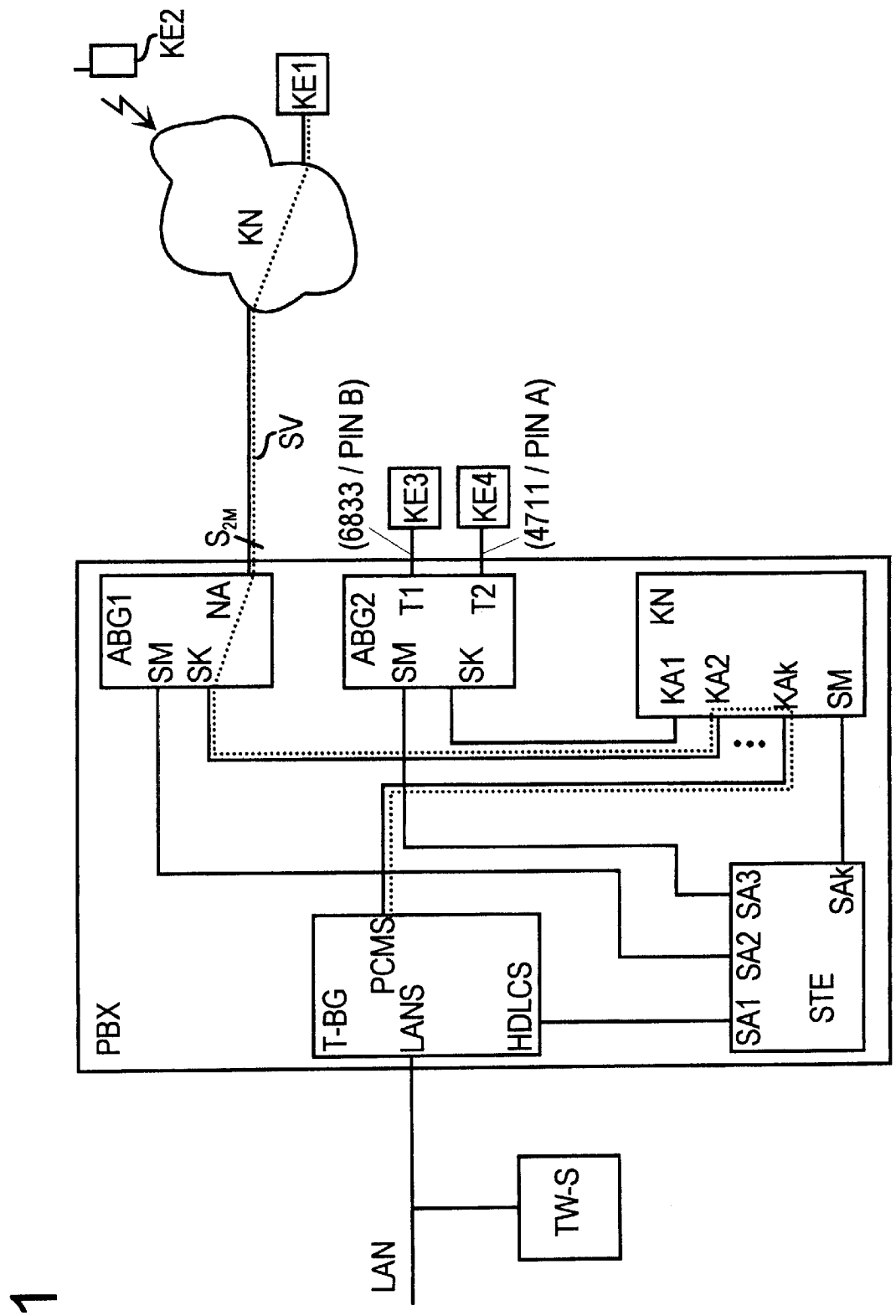
FIG. 1 is a schematic structure diagram illustrating the essential functional units involved in the teleworking concept of this invention.

Referring now to the figures of the drawing in detail and first, particularly, to FIG. 1 thereof, there is seen a communications system PBX with a teleworking subscriber line module—referred to below as teleworking module T-BG—which is arranged in the system and is implemented in the form of a subscriber terminal unit. The communications system PBX has further subscriber terminal units/network connection units for connection to communications terminals. By way of example, a first and a second connection unit ABG1, ABG2 are represented. Furthermore, the communications system PBX contains a switching matrix unit KN which has a plurality of bi-directional, time-division-multiplex-oriented connection ports KA1 . . . Kak. The connection ports KA1 . . . KAk are realized in the form of PCM connections (PCM=Pulse Code Modulation), also referred to as PCM highways, speech highways or $S_{2M}$ connections. Each PCM highway comprises both 30 user channels, which are realized in the form of ISDN-oriented B channels (ISDN =Integrated Services Digital Network) with a transmission rate of 64 kbit/s, and a signaling channel, which is realized in the form of an ISDN-oriented D channel with a transmission rate of 64 kbit/s. The switching matrix unit KN is connected via a connection port KAk to a bi-directional, time-division-multiplex-oriented PCM interface PCMS of the teleworking module T-BG. Via the further connection ports KA1, KA2, the switching matrix unit KN is connected to a bi-directional time-division-multiplex-oriented connection SK of the first and second connection units ABG1, ABG2, respectively.

Furthermore, a control unit STE having a plurality of control connections SA1 . . . SAk is arranged in the communications system PBX. The control unit STE is connected to a control input SM of the switching matrix unit KN via a control connection SAk. Via the further control connections, SA1 . . . SA3, the control unit STE is connected both to an HDLC interface HDLCS, which is arranged at the teleworking module T-BG, and to control connections SM of the first and the second connection units ABG1, ABG2.

A communications network KN is connected to a network connection NA—for example a bi-directional time-division-multiplex-oriented $S_{2M}$ connection—of the first connection unit ABG1. The communications network KN may be, for example, an ISDN-oriented communications network, an analog communications network or a radio communications network. A first external terminal KE1 and a second external terminal KE2 (for example a mobile terminal) are connected to the communications network KN. A first internal terminal KE3 with a communications-system-internal call number 6833 is connected to a first subscriber terminating line T1—for example an $S_0$ connection (2B+D, i.e. two ISDN-oriented user data channels and an ISDN-oriented signaling channel)—of the second connection unit ABG2, and a second internal terminal KE4 with a communicationssystem-internal call number 4711 is connected to a second subscriber terminating line T2 of the second connection unit ABG2.

A local computer network LAN is connected to the communications system PBX via a LAN interface LANS of the teleworking module T-BG. A computer, for example a personal computer—referred to below as teleworking computer TW-S—which is used to control the teleworking module T-BG—is arranged in the local computer network LAN.

Figure 2:
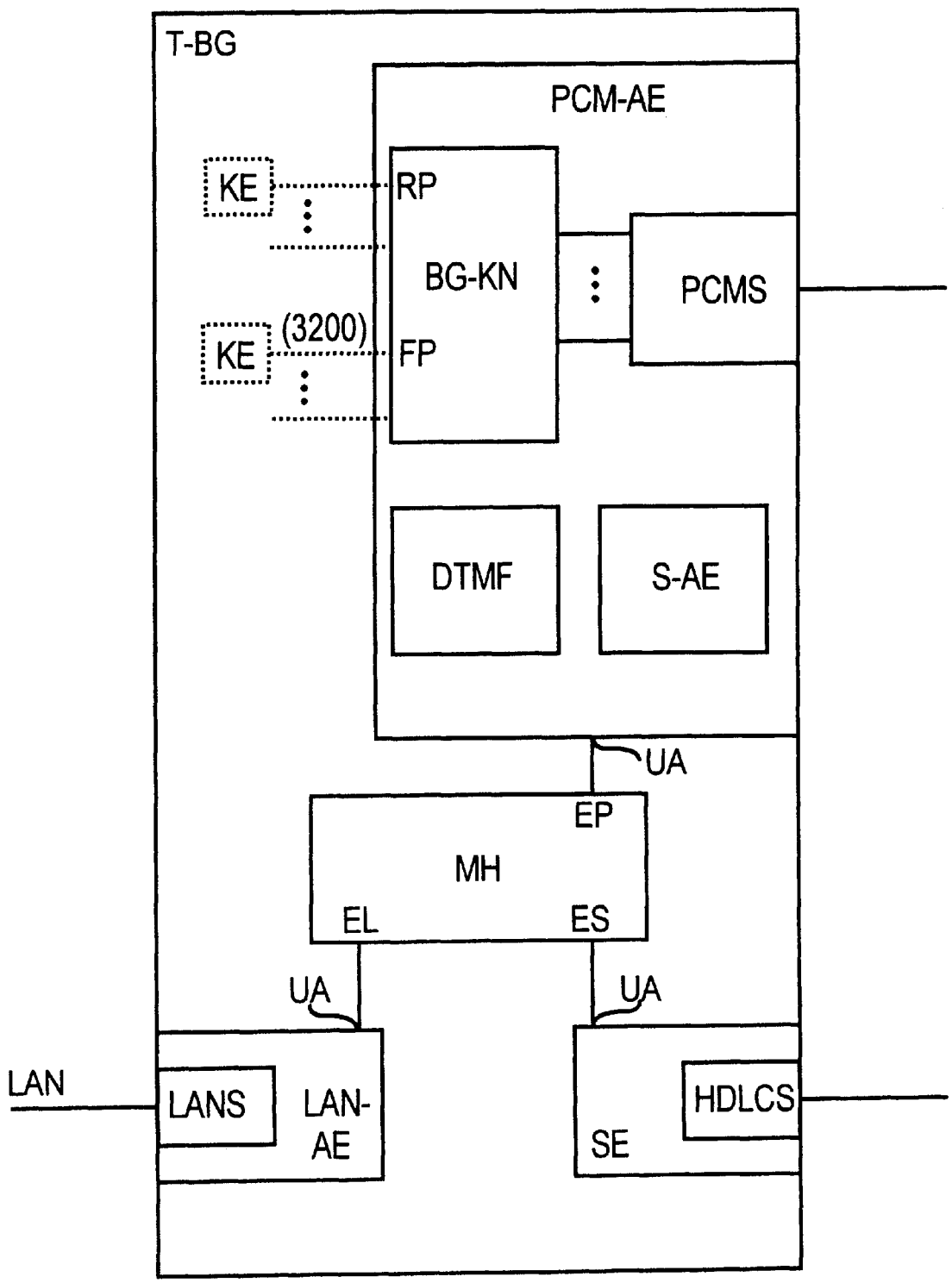
FIG. 2 is a schematic structure diagram illustrating the essential functional units of a teleworking subscriber line module of a communications system.

Referring now to FIG. 2, there are shown the essential functional units of the teleworking module T-BG. The teleworking module T-BG has a LAN connection unit LAN-AE with a LAN interface LANS. It is possible to connect the LAN interface LANS to the local computer network LAN. The teleworking module T-BG also has a PCM connection unit PCM-AE with a bi-directional, time-division-multiplex-oriented PCM interface PCMS, it being possible to connect the PCM interface PCMS to the connection port KAk of the switching matrix unit KN of the communications system PBX. Furthermore, the PCM connection unit PCM-AE has a module switching matrix unit BG-KN, which is connected to the PCM interface PCMS. A DTMF detection unit DTMF and an output unit S-AE are also arranged in the PCM connection unit PCM-AE.

Furthermore, a signaling unit SE, with an HDLC interface HDLCS, is arranged at the teleworking module T-BG. The signaling unit SE can be connected to the control port SA1 of the control unit STE of the communications system PBX via the HDLC interface HDLCS. The LAN connection unit LAN-AE, the PCM connection unit PCM-AE and the signaling unit SE are each connected via a port UA to a port EL, EP, ES of a conversion unit MH which is arranged at the teleworking module T-BG.

In the conversion unit MH it is. decided, by reference to address information—i.e. destination and origin data—which is contained in data which are received via the PCM connection unit PCM-AE, the LAN connection unit LAN-AE or the control unit SE, whether the received data are intended to be transferred on or are intended to control the teleworking module T-BG. If the data are to be transferred on, they are converted in accordance with the protocol and transferred to the destination address.

Data packets are transferred between the LAN connection unit LAN-AE and the teleworking computer TW-S on the basis of the TCP/IP protocol (TCP/IP—Transmission Control Protocol/Internet Protocol) for example. Data packets are transferred between the control unit STE of the communications system PBX and the signaling unit SE on the basis of the HDLC protocol (HDLC=High Level Data Link Control).

In order to sign on the first external terminal KE1 to the communications system PBX, a teleworking call number is entered into the first external terminal KE1 by a subscriber, for example. Subsequently, a voice link SV (represented by 10 broken lines in FIG. 1) is set up between the first external terminal KE1 and the teleworking module T-BG.

In order to identify the first external terminal KE1 to the communications system PBX, a recorded voice message is transferred to the first external terminal KE1 by the output unit S-AE of the teleworking module T-BG. The message requests that the subscriber enter the call number which is assigned to the first external terminal KE1 in the communications network KN and a personal code number PIN (PIN=Personal Identification Number). These identification data which are transferred in the form of DTMF signals over the voice link SV are evaluated by the DTMF detection unit DTMF and transferred on to the teleworking computer TW-S via the LAN connection unit LAN-AE. The teleworking computer TW-S marks the first external terminal KE1 as having been identified, for example by means of an entry of the first external terminal KE1 in a list, if this has not already taken place during an earlier identification. In addition, the subscriber may also be requested to provide a personal password.

By means of the code number PIN, transferred in the identification data, it is determined via which internal subscriber connection port of the communications system PBX the subscriber wishes to sign on to the communications system, by reference to a list stored in the teleworking computer TW-S. If, for example, the code number PIN A is transferred within the scope of the identification, the first external terminal KE1 is signed on for the second internal terminal KE4 (with the communications-system-internal call number 4711).

If the call number which has been assigned to the first external terminal KE1 in the communications network KN has been automatically transferred, for example within the scope of an ISDN link (within the scope of the "calling party number" performance feature), from the first external terminal KE1 to the teleworking module T-BG, it is tested in the teleworking computer TW-S whether the first external terminal KE1 has already been identified, i.e. whether the first external terminal KE1 is already stored in the list. If the first external terminal KE1 has not yet been identified, the output unit S-AE of the teleworking module T-BG transfers to the first external terminal KE1 a further recorded voice message which requests the subscriber to enter the personal code number PIN and/or the personal password.

The code number PIN which is provided by the subscriber can alternatively be assigned to a virtual connection port—that is to say a connection port which is present only in purely logical terms and which is therefore only set up in terms of management technology and does not have any hardware components—of the communications system PBX. As a result, subscribers who do not have any physically existing internal terminal assigned to them can also utilize the performance features of the communications system at the external terminal.

The signing on of the first external terminal KE1 is checked by reference to a list (not illustrated) which is stored in the teleworking computer TW-S and which contains the communications-system-internal call numbers and/or code numbers PIN which are authorized for the teleworking session. If the check confirms the sign-on, a virtual connection port—for example the virtual connection port FP with the communications-system-internal call number 3200—of the teleworking module T-BG is assigned to the first external terminal KE1 by the teleworking computer TW-S. At the same time, the activation of the "call rerouting" performance feature which is implemented by the communications system PBX causes all the calls which are routed to the internal subscriber connection port (for. example the second subscriber terminating line T2 of the second connection unit ABG2 with the communications-system-internal call number 4711), which is designated by the communications-system-internal call number and/or by the code number PIN, to be rerouted to the virtual connection port FP of the teleworking module T-BG.

If the voice link SV is interrupted (this corresponds to the normal case) after the sign-on, for example as a result of the receiver at the first external terminal KE1 being hung up, renewed identification (transfer of the call number assigned to the first external terminal KE1 in the communications system KN), of the first external terminal KE1 to the communications system PBX is necessary in order to set up a new link to the teleworking module T-BG.

In addition, provided that the first external terminal KE1 has been signed on to the communications system PBX, terminal-oriented signaling information which is to be transferred from the control unit STE of the communications system PBX to the second internal terminal KE4 (communications-system-internal call number 4711) is rerouted to the virtual connection port FP of the teleworking module T-BG. The terminal-oriented signaling information is based on a signaling protocol Cornet-TS, such as is usually available during the exchange of signals between internal terminals and the communications system PBX. The terminal-oriented signaling information is transferred from the control unit STE of the communications system PBX to the teleworking computer TW-S via the teleworking module T-BG. For this purpose, the terminal-oriented signaling information which is received via the HDLC interface HDLCS of the signaling unit SE is evaluated in the conversion unit MH, converted in accordance with the protocol and transferred on to the teleworking computer TW-S via the LAN interface LANS of the LAN connection unit LAN-AE.

A message (for example an item of terminal-oriented signaling information), which is transmitted from the control unit STE of the communications system PBX to the virtual connection port FP is evaluated in the teleworking computer TW-S and, in cases in which this message is to be transferred on to the first external terminal KE1, it is converted into a voice message or text message (by means of a so-called SMS service: Short Message Service) which corresponds to the item of terminal-oriented signaling information. The voice message or text message is then transferred via a newly set-up link to the first external terminal KE1 and output at that terminal, for example by means of a loudspeaker or on a display.

If a link set-up to the second.internal terminal KE4 is initiated from a further terminal, for example from the second external terminal KE2 or from the first internal terminal KE3, provided that the first external terminal KE1 is signed on to the communications system PBX a first partial link is set up between the further terminal and the virtual connection port FP of the teleworking module T-BG by virtue of the activation of the rerouting feature. In a further step, a second partial link is set up between a further virtual connection port RP (frequently referred to as "remote port" in the literature) of the teleworking module T-BG and the first external terminal KE1 by reference to the call number of the first external terminal KE1 in the communications network KN, said call number being transferred in the identification data. In a final step, the first partial link and the second partial link are connected in the module switching matrix unit BG-KN of the teleworking module T-BG, giving rise to a terminal link between the first external terminal KE1 and the further terminal.

In the case of a link set-up to a further (internal or external) terminal brought about by the first external terminal KE1, the renewed entry of the teleworking call number sets up a voice link SV to the further virtual connection port RP of the teleworking module T-BG. After the identification data have been transferred via the voice link SV, the output unit S-AE of the teleworking module T-BG transfers to the first external terminal KE1 a recorded voice message which informs the subscriber of possible actions, for example outputting of a voice message which has been stored in the communications system PBX or setting up of a terminal link to a further terminal. The inputting of a significant key combination at the first external terminal KE1 causes an item of control information which corresponds to the key combination and is in the form of DTMF signals to be transferred via the voice link SV to the teleworking module T-BG which signals to the communications system PBX that a terminal link to a further terminal is to be set up from the virtual connection port FP of the teleworking module T-BG. Subsequently, the control unit STE of the communications system PBX sets up a partial link between the virtual connection port FP of the teleworking module T-BG and the switching matrix unit KN of the communications system PBX by seizing a free user channel of the PCM highway which connects the switching matrix unit KN and the teleworking module T-BG.

After the voice link SV has been connected to the partial link in the module switching matrix unit BG-KN of the teleworking module T-BG, a dial tone (signals readiness for the entry of dialing information) is issued at the first external terminal KE1. The dialing information—for example 6833 for the first internal terminal KE3—which is then entered at the first external terminal KE1 is transferred, in the form of DTMF tones, via the voice link SV to the teleworking module T-BG and from there it is transferred on via the teleworking computer TW-S to the control unit STE of the communications system PBX. Subsequently, a terminal link is set up between the first external terminal KE1 and the first internal terminal KE3 by the control unit STE of the communications system PBX.

If there is the possibility of automatically transferring to the teleworking module T-BG for example within the scope of an ISDN link (within the scope of :the calling party number or caller-ID performance feature) the call number which has been assigned to the first external terminal KE1 in the communications network KN, the subscriber can initialize a link set-up from the communications system by entering a specific teleworking call number. The teleworking module T-BG detects by reference to the specific teleworking call number that a terminal link should be set up from the first external terminal KE1 to a further terminal and does not accept the call of the first external terminal KE1. In a subsequent step, a link is set up starting from.the further virtual connection port RP of the teleworking module T-BG to the first external terminal KE1, initiated by the communications system, by reference to the call number of the first external terminal KE1 in the communications network KN which has been automatically transferred within the scope of the ISDN link, so that the subscriber at the first external terminal KE1 does not incur any fees for the terminal link which is to be set up to the further terminal.

The items of control information which are transmitted by the first terminal KE1 during a terminal link between the first external terminal KE1 and a further terminal are transferred in the form of DTMF signals to the teleworking module T-BG via the terminal link. The items of control information are identified at the teleworking module T-BG by the DTMF detection unit DTMF, converted in the conversion unit MH in accordance with the protocol and transferred onto the teleworking computer TW-S via the LAN connection unit LAN-AE. In the teleworking computer TW-S, the received control data are converted, for example by reference to a list (not illustrated) into terminal-oriented signaling information items which are based on a signaling protocol Cornet-TS, such as is usually available between the communications system PBX and internal terminals. These converted terminal-oriented signaling information items are transferred to the control unit STE of the communications system PBX via the teleworking module T-BG. If the control information items which are transferred by the first external terminal KE1 in the form DTMF signals cannot be interpreted by the teleworking module T-BG, the DTMF signals are transferred onto the further terminal.

After the terminal link between the first external terminal KE1 and the further terminal has been cleared, the further virtual connection port RP of the teleworking module T-BG is released by the teleworking computer TW-S and is available for a new link set-up. The virtual connection port FP of the teleworking module T-BG is not released until after the subscriber has caused the first external terminal KE1 to be signed off. After the signing off, the terminal-oriented signaling information items which are to be transferred from the control unit STE of the communications system PBX to the subscriber is transferred, owing to the deactivation of the call rerouting feature at the communications system PBX, to the connection port of the internal terminal which is assigned to the subscriber—for example to the connection port of the section internal terminal KE4 with the communications-system-internal call number 4711.

We claim:

1. A method of providing performance features made available to internal subscriber terminating lines in a communications system to an external terminal, the method which comprises:

communicating between internal terminals and a communications system within a defined signaling protocol;

providing a teleworking subscriber line module in the communications system;

providing a teleworking computer for controlling the teleworking subscriber line module and connecting the teleworking computer to the teleworking subscriber line module via a local computer network;

setting up a voice link between an external terminal and the teleworking subscriber line module of the communications system by signing on the external terminal with the communications system;

transferring via the voice link control information input at the external terminal in the form of assigned DTMF signals to the teleworking subscriber line module; and identifying the DTMF signals received at the teleworking subscriber line module, converting the DTMF signals into terminal-oriented signaling information according to the defined signaling protocol, and transferring the converted DTMF signals to a control unit of the communications system via the teleworking computer.

2. The method according to claim 1, which comprises checking a sign-on authorization with the teleworking computer by referring to subscriber-specific data transmitted from the external terminal.

3. The method according to claim 2, which comprises, during a sign-on operation, assigning with the teleworking computer a virtual subscriber connection port of the teleworking subscriber line module to the external terminal, and rerouting data directed by the control unit to an internal subscriber terminating line as identified by the subscriber-specific data, to the virtual subscriber connection port.

4. The method according to claim 3, which comprises outputting data transferred to the external terminal via the virtual subscriber connection port at the external terminal.

5. The method according to claim 4, wherein the step of outputting comprises outputting as an audible announcement.

6. The method according to claim 4, wherein the step of outputting comprises outputting as a visual display.

7. The method according to claim 1, which comprises setting up a connection between the external terminal and a further terminal subsequently to a sign-on, by routing the terminal link between the external terminal and a further terminal via the teleworking subscriber line module.

8. The method according to claim 7, which comprises transferring the control information from the external terminal to the communications system via the terminal link in a DTMF signal format.

9. The method according to claim 8, which comprises, if a DTMF signal cannot be identified at the teleworking subscriber line module, transferring the DTMF signal to the further terminal.

10. The method according to claim 7, which comprises simultaneously routing a plurality of terminal links in each case between one external terminal signed on to the communications system and one further terminal via the teleworking subscriber line module.

11. The method according to claim 1, which comprises setting up the internal subscriber terminating line in the form of a virtual connection port.

12. A teleworking subscriber line module in a communications system, the communications system having a control unit and a switching matrix unit with a bi-directional, time-division-multiplex-oriented port, comprising:

a LAN connection unit with a LAN interface for connecting the subscriber line module to a local computer network;

a signaling unit having an HDLC interface for connecting to a control unit of a communications system;

a PCM connection unit having a PCM interface for connecting to a bi-directional, time-division-multiplex-oriented port of a switching matrix unit of the communications system, said PCM connection unit having a DTMF connection unit for detecting and evaluating control information received in DTMF signals via a user data link; and a conversion unit connected between said signaling unit and said PCM connection unit for converting data to a given transmission protocol and transferring the data between the signaling unit and the PCM connection unit.

13. The module according to claim 12, which further comprises an output unit for transferring messages stored in the teleworking subscriber line module to an external terminal.

14. The module according to claim 13, wherein the output unit transfers the messages in a format to be output in one of an announcement and a visual display in the external terminal.

* * * * *